United States Patent [19]

Hoffmann

[11] 4,395,206

[45] Jul. 26, 1983

[54] SEAL COMPENSATED GEOMETRY ROTARY MOTION DEVICE

[75] Inventor: Benjamin Hoffmann, Minneapolis, Minn.

[73] Assignee: Trochoid Power Corporation, Eden Prairie, Minn.

[21] Appl. No.: 258,429

[22] Filed: Apr. 28, 1981

[51] Int. Cl.[3] .......... F01C 1/10; F01C 1/22; B23P 15/00; B23P 15/10

[52] U.S. Cl. .......... 418/61 A; 418/61 B; 418/113; 418/129; 29/156.4 R; 29/156.5 R

[58] Field of Search .......... 418/61 A, 61 B, 113, 418/122, 123, 129; 29/156.4 R, 156.5 R; 51/DIG. 32

[56] References Cited

U.S. PATENT DOCUMENTS

| | | | |
|---|---|---|---|
| 2,988,008 | 6/1961 | Wankel | 418/61 A |
| 3,102,492 | 9/1963 | Bentele et al. | 418/61 A |
| 3,139,072 | 6/1964 | Froede | 418/61 A |
| 3,196,848 | 7/1965 | Bensinger | 418/61 A |
| 3,323,498 | 6/1967 | Kraic et al. | 418/122 |
| 3,764,239 | 10/1973 | Huf | 418/61 A |
| 3,860,366 | 1/1975 | Haglund et al. | 418/61 A |
| 3,958,906 | 5/1976 | Catterson et al. | 418/61 A |
| 3,990,817 | 11/1976 | Ruf et al. | 418/61 A |
| 3,994,637 | 11/1976 | Fritzsche et al. | 418/61 B |
| 4,008,001 | 2/1977 | Tsujibayashi et al. | 418/61 A |
| 4,018,548 | 4/1977 | Berkowitz | 418/61 A |
| 4,070,137 | 1/1978 | Goloff | 418/61 A |

FOREIGN PATENT DOCUMENTS

| | | | |
|---|---|---|---|
| 706674 | 3/1965 | Canada | 418/61 A |
| 1164746 | 3/1964 | Fed. Rep. of Germany | 418/61 A |
| 1201607 | 10/1965 | Fed. Rep. of Germany | 418/61 A |
| 1297620 | 6/1969 | Fed. Rep. of Germany | 418/61 A |

OTHER PUBLICATIONS

F. J. Robinson et al., "Machining Trochodial Profiles by Numerical Control", Machining and Production Engineering, Nov. 6, 1974, pp. 506–511.

J. R. Colbourne, "The Geometry of Trochoid Envelopes and Their Application in Rotary Pumps," Mechanism and Machine Theory, 1974, vol. 9, pp. 421–435.

*Primary Examiner*—John J. Vrablik

*Attorney, Agent, or Firm*—Hill, Van Santen, Steadman, Chiara & Simpson

[57] ABSTRACT

Conventional industry practice has been to provide apex seals along adjoining intersecting peripheral surfaces of the envelope members in trochoidal rotary devices. The trochoidal member profiles are then recessed by a seal offset amount and the seals extended from the apices of the envelope member by the seal offset amount to minimize reciprocation of the seals in their grooves. In accordance with the invention, modified epitrochoids and corresponding envelopes are formed so that sealing faces of the apex seals can be substantially continuous with the envelope peripheral surfaces. In this manner, nearly ideal expansion ratios are achievable in such rotary devices and wider sealing faces can be used than heretofore practical.

24 Claims, 8 Drawing Figures

FIG. 1
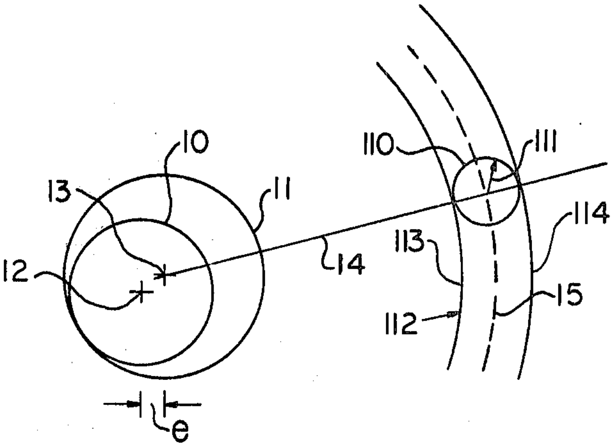
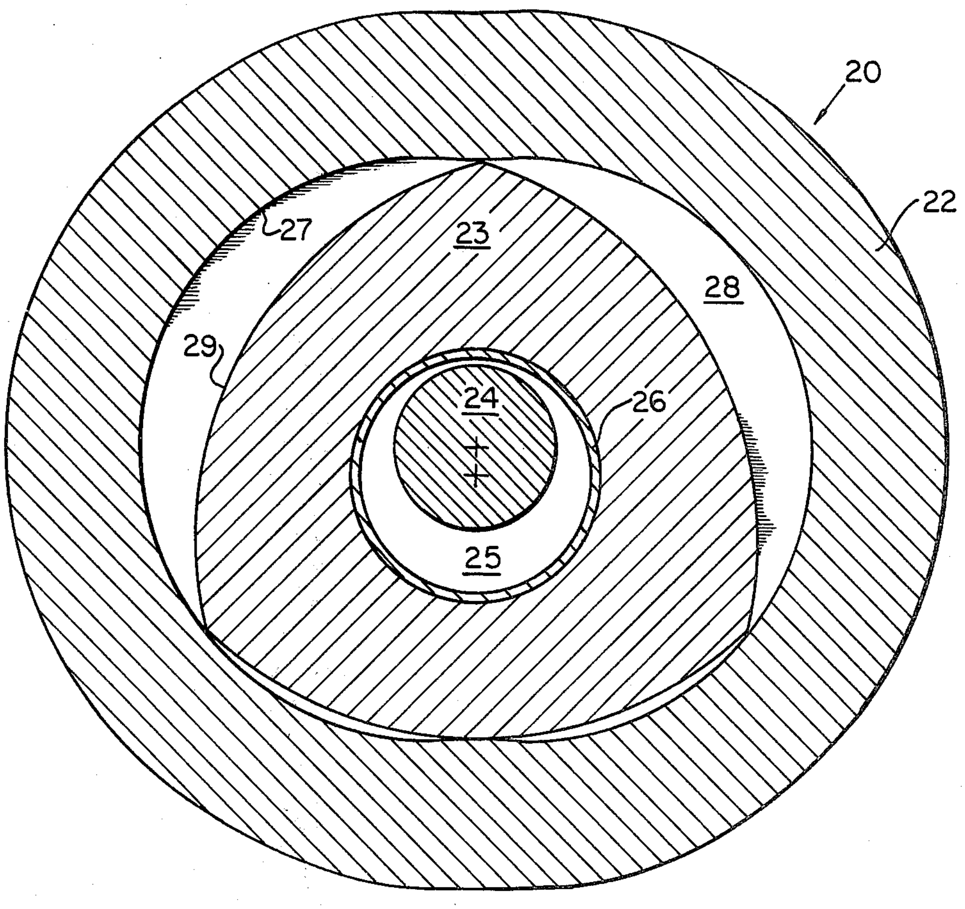
FIG. 2

SEAL COMPENSATED GEOMETRY ROTARY MOTION DEVICE

BACKGROUND OF THE INVENTION

1. Field of the Invention

The invention relates to trochoidal rotary expansible chamber devices having a planetating rotor and, more particularly, their construction and manufacture for approaching ideal expansion ratios.

2. The Prior Art

Trochoidal rotary expansible chamber devices, such as the Wankel or epitrochoidal rotary machines, generally comprise a housing defining a cavity in which is mounted a rotor rotatable in a planetating fashion. Trochoidal rotary devices may be divided into two groups referrd to as inner envelope and outer envelope types. In an inner envelope configuration, the profile of the housing cavity is the trochoidal curve and the peripheral profile of the rotor is the inner envelope of the trochoidal curve. In an outer envelope device, the rotor profile is the trochoidal curve and the housing cavity profile is the outer envelope of that curve. Variable spaces formed between facing peripheral surfaces of the rotor and housing cavity serve as working chambers for expansion engines, compressors, expanders, meters, etc. The working chambers are sealed with radially extending apex seals positioned along intersection lines between adjoining peripheral faces on the envelope curve surface. Typical apex seal arrangements for use in epitrochoidal inner envelope rotary machines are shown, for example, in Wankel U.S. Pat. No. 2,988,008 and Froede U.S. Pat. No. 3,139,072.

In currently produced rotary expansible chamber devices of the trochoidal type, apex seals are provided with curved profile sealing faces and mounted in the corresponding envelope apices such that the seal surfaces extend outward therefrom by a distance approximating their radii of curvature. The centers of curvature for the apex seal faces are located at the envelope apex points. Accordingly, the current manufacturing technique is to first generate an ideally desired trochoid curve profile and, then, recess the periphery by an amount equal to the outward extension or offset of the apex seals to be used. This offset amount can usually be characterized, in the case of apex seals having curved profile faces, as being one-half the width of the radial sealing elements or the radius of the face profile. The trochoid profiles are carved out by this seal offset amount in order to minimize seal reciprocation in the seal grooves, which tends to promote the formation of chatter marks and wear. This technique is described, for example, in the *Wankel RC Engine* (1st ed. 1969) by R. F. Ansdale at pages 81 and 133, and the Wankel U.S. Pat. No. 2,988,008. In some instances, it has been suggested that the trochoidal profile should be carved even more than the apex seal radial offset amount at selected portions of the profile periphery to prevent chattering, such as disclosed in the Froede U.S. Pat. No. 3,139,072.

The disadvantage of this current practice of recessing the trochoidal profile surface is that there is created an additional space to the working chambers which is never varied by movement of the rotor. Thus, the overall expansion ratios for current such rotary devices are significantly less than ideal. The present invention overcomes this deficiency by providing modified envelope surface which effectively eliminate seal offset clearance volumes and, thereby, approach ideal expansion ratios.

SUMMARY OF THE INVENTION

A rotary expansible chamber device of the planetating rotor type has its working chamber profiles based upon an inventively modified trochoid curve. The modified trochoid curve serves to make adjoining and intersecting peripheral faces of the envelope member substantially continuous with sealing faces of apex seals therefor. Relative movement between the trochoid and envelope members during operation of the rotary device can be accomplished at substantially zero clearance between corresponding running surfaces thereof. To form such modified rotary device profiles, there is initially selected a rotor eccentric length, the generating and base circle dimensions, a radial arm length for tracing a predetermined, ideally desired epitrochoidal profile and a common radius of curvature for curved sealing faces of the apex seals. The ideal trochoid profile is no longer used as the basis for forming the rotary device. A modified trochoidal profile is generated by replacing the tracing tip of the generating arm with a disk having a radius equal to the apex seal offset, usually the sealing face profile radius and then tracing out a trochoidal swath. The swath produces inner and outer outlines on opposed sides of what would have been the ideal trochoidal profile. For an inner envelope device, the outer outline serves as the trochoidal curve from which the inner envelope profile is derived. For an outer envelope device, the inner outline serves as the trochoidal curve. This inventive inner and outer envelope trochoidal devices thus derived avoid the presence of seal offset clearance spaces in the working chambers and thereby approach ideal expansion ratios. To maintain approximately the same displacement as the ideal trochoidal device, the generating arm radius may be increased for producing the inventive outer envelope device, or decreased for the inventive inner envelope machine, by the seal offset amount. Further, much wider seals may be used in the inventively constructed devices than conventional practice for better sealing contact and wear characteristics, since there is no longer the drawback that wider seals require greater clearance spaces in the working chambers.

BRIEF DESCRIPTION OF THE DRAWINGS

FIG. 1 is a schematic diagram illustrating a method for generating a modified epitrochoidal profile in accordance with the present invention.

FIG. 2 is a schematic cross-sectional view of ideal working member profiles for an epitrochoidal device of the inner envelope type.

DESCRIPTION OF THE PREFERRED EMBODIMENTS

Figure 3:
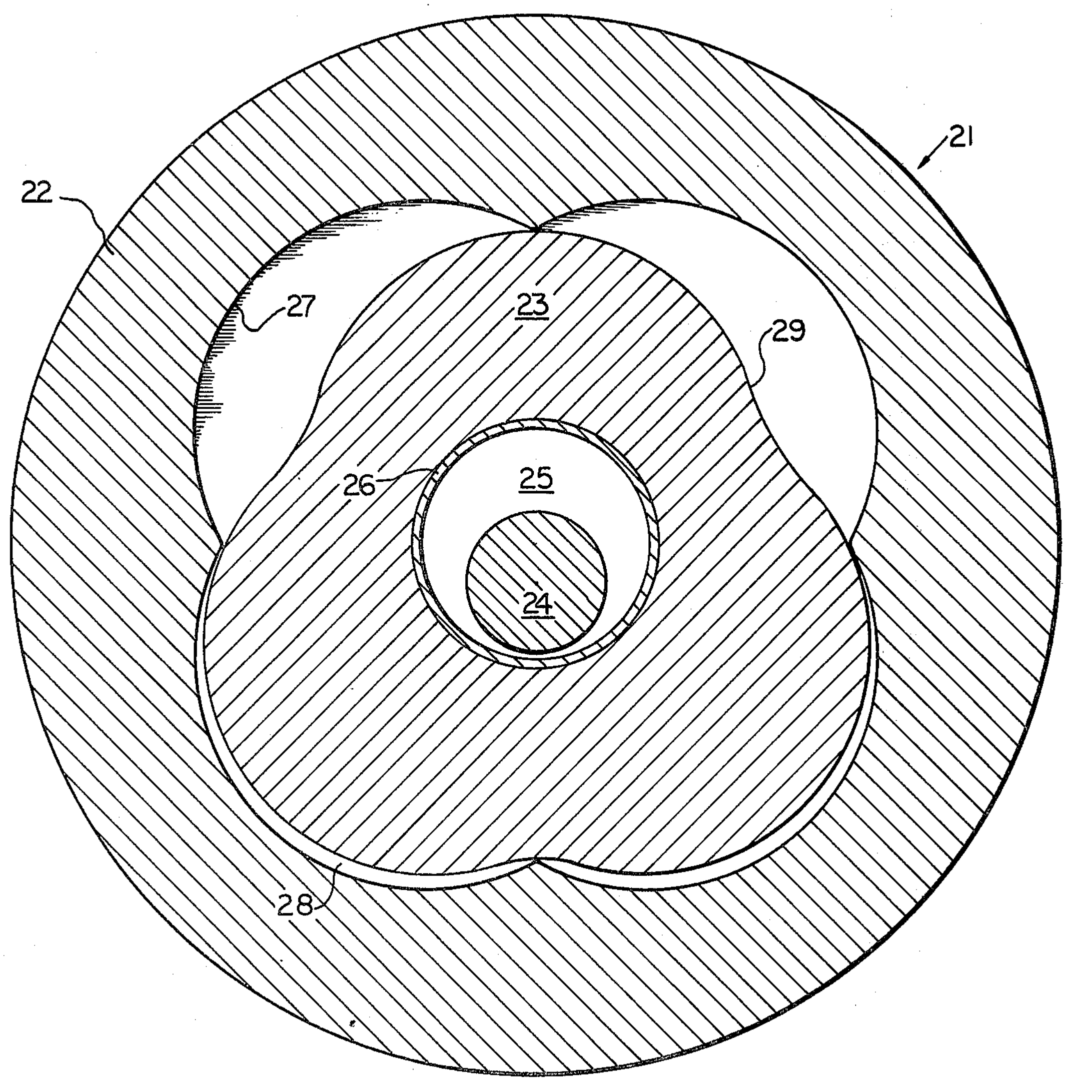
FIG. 3 is a schematic cross-sectional view of ideal working member profiles for an epitrochoidal device of the outer envelope type.

As those skilled in the art will reognize, the terms "inner envelope" and "outer envelope" refer to the manner in which working member profiles are generated for trochoidal rotary expansible chamber devices. Typical forms of trochoidal devices have fixed housing members for containing rotors traveling in a planetating rotary fashion therein. The known forms have either inner rotors in the form of epitrochoid or hypotrochoid curves or they have inner rotors in the form of envelopes derived from those curves. The designations "epitrochoid" and "hypotrochoid" refer to the manner in which a trochoidal machine's profile curves are generated as described in the Bonavera U.S. Pat. No. 3,117,561.

The manner in which trochoidal curves are formed is well-known in the art. The instant invention applies to all forms of rotary trochoidal machines; however, for purposes of illustration, the invention will be described with reference epitrochoidal-type machines.

An epitrochoidal curve is formed by first selecting a base circle and a generating circle having a diameter greater than that of the base circle. The base circle is placed within the generating circle so that the generating circle is able to roll along on the circumference of the base circle. The distance between the centers of the base and generating circles is conventionally referred to as the eccentricity "e" of the epitrochoidal machine. The epitrochoidal curve is defined by the locus of points traced by the tip of a radially extending generating or drawing arm, fixed to the generating circle and having its inner end pinned to the generating circle center, as the generating circle is rolled about the circumference of the base circle which is fixed. The envelopes are generated by holding the generating circle stationary and rolling the base circle, carrying the epitrochoid curve with it, about the interior circumference of the generating circle. The inner envelope is the inner outline of the path made by the moving epitrochoid; and the outer envelope is the outer outline of this path. In a typical "inner envelope" epitrochoidal device, the rotor is defined by the envelope profile and rotates in the relationship of the generating circle rolling around the base circle. In an "outer envelope" epitrochoidal device, the rotor is defined by the epitrochoidal curve profile such that the rotor rotates in the relationship of the base circle rolling around the generating circle.

Inner envelope and outer envelope epitrochoidal profiles can take many configurations. Spaces formed between the epitrochoidal working member profile and the peripheral wall surface of the envelope working member serve to define fluid working chambers, such as may be used for internal combustion engines, compressors, expanders, meters, etc. Furthermore, although it is conventional to maintain rotor housing stationary while the rotor moves within the housing cavity, it is also within the contemplation of the present invention to apply to trochoidal machines wherein any one of the three machine components (i.e., the crankshaft, trochoidal member, or envelope member) may be fixed, such as disclosed, for example in Paschke U.S. Pat. No. 3,091,386 where the crankshaft is stationary and the rotor housing rotates.

With reference to FIG. 1, there is illustrated the manner in which an ideal epitrochoid curve profile is generated. There is first selected a base circle 10 and a generating circle 11 having a diameter greater than that of the base circle. The ratio of diameters typically forms an integral number. The corresponding centers 12 and 13 of the circles are spaced apart by the eccentricity distance e such that the circles share a common point on their circumferences. A generating arm length 14 is then determined, whereupon an ideal epitrochoidal curve 15 is defined by the locus of points traced by the tip of the drawing arm fixed to the generating circle 11 as the generating circle is rolled about the circumference of the base circle which is fixed.

FIG. 2 illustrates ideal profiles generated for working members of an epitrochoidal device 20 of the inner envelope type. FIG. 3 illustrates working member profiles generated for an epitrochoidal device 21 of the outer envelope type. In both instances, there is defined a housing 22, a rotor 23, and a rotary shaft 24 which corresponds to the base circle. The rotor 23 moves in a planetating rotary fashion about the shaft 24 within the housing 22 over an eccentric lobe 25 connected to the shaft. The rotor is rotatably mounted over the eccentric 25 via an annular sleeve bearing 26. The center of the eccentric is common with the generating circle center in an inner envelope device and in an outer envelope device. To produce the planetating motion of the rotor about the eccentric as it turns on the axis of the shaft 24, phasing gear mechanisms (not shown) are provided, such as shown in Chen U.S. Pat. No. 3,881,847 for an inner envelope epitrochoid. Such phasing gears as is well-known in the art, comprise a first gear fixed and rotatable with the rotor and a concentric second gear fixed with respect to the rotor housing. In the case of an inner envelope device, the rotor gear is a ring gear; while, for an outer envelope device, the rotor gear is a pinion gear. The relationship between the first and second gears insures continuous contact between each of the apices of the envelope working member and the peripheral profile of the epitrochoid member.

The rotary devices 20 and 21 use the space formed between peripheral wall surfaces 27 of the housing cavity 28 and peripheral profile faces 29 of the rotor 23 to define fluid working chambers, such as for engines, compressors, expanders, meters, etc. For the sake of simplicity, inlet and outlet ports for fluid flow through the working chambers are not shown. The profiles thus exhibited in FIGS. 2 and 3 represent ideal epitrochoid and envelope curves. If the devices 20 and 21 were able to operate without seals, the expansion ratios thus achieved by movement of the working members shown would be the ultimate or ideal ratios.

Although device 20 depicts a substantially triangular shaped rotor mounted for relative movement in a two-lobed housing cavity and device 21 shows a rotor having three convex-extending lobe portions mounted for relative movement in a housing cavity having four concave-shaped peripheral lobe surfaces, this is only illustrative of one form of profiles which inner envelope and outer envelope epitrochoidal profiles can take. Many other configurations of epitrochoidal profiles are possible in inner envelope and outer envelope type devices, depending upon the eccentric spacing between the axes of the generating and base circles and the ratio of their relative diameters.

In practice, rotors must be sealably mounted for movement about housing cavity wall surfaces as those skilled in the art will appreciate. In the well-known manner, peripheral seal strips extend about the rotor members to sealably isolate the device working chambers from the spaces formed between the axially spaced sidewalls of the rotor and the corresponding facing sidewalls of the rotor housing. Annular seals are placed beneath the peripheral seal strips on both sidewalls of the rotor to sealably isolate the eccentric and shaft space from the area beneath the peripheral seal strips. Such sealing arrangements are shown, for example, in the case of an outer envelope epitrochoidal device in Peras U.S. Pat. No. 3,193,186.

Figure 4:
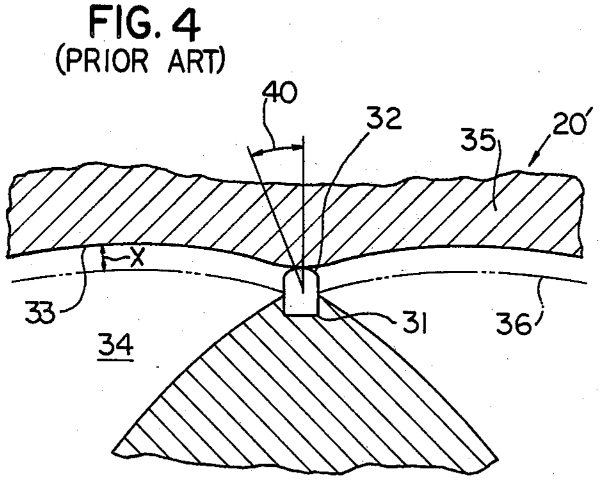
FIG. 4 (PRIOR ART)
FIG. 4 is a schematic, broken-away cross-sectional view showing profiles for working members at an apex area in a conventional inner envelope epitrochoidal device.
Figure 5:
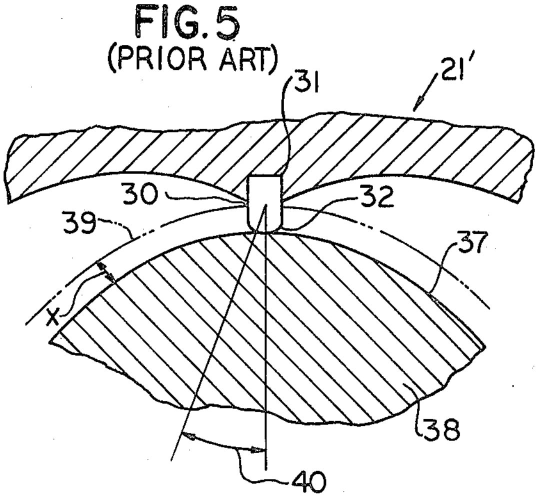
FIG. 5 (PRIOR ART)
FIG. 5 is a schematic broken-away cross-sectional view showing working member profiles at an apex area in a conventional outer envelope epitrochoidal device.

To seal working chambers across envelope member apices (i.e., the points in the profile where adjoining peripheral faces intersect), radially extending apex seal means 30 are conventionally provided. With reference to FIGS. 4 and 5, it has been conventional practice to mount axially elongated apex seal members extending radially of their corresponding envelope working member, in groove recesses 31 located at apex points on the envelope profile. Apex seals are generally formed with curved sealing surface profiles 32 extending outwardly from the apex point for sealing engagement along peripheral wall surfaces of the epitrochoid member. The apex seals are spring loaded in the radial direction to ensure continuous sealing engagement with the profile surface of the epitrochoid member. The center of curvature for the sealing surfaces is typically located at the apex point of the envelope member profile such that seal surfaces extend outward beyond adjoining peripheral wall surfaces of the envelope member a distance typically equal to the radius of curvature. To accommodate the outward extension of the seals without subjecting the seal members to undue radial accelerations and wear, conventional practice in the industry has been to recess or carve out the corresponding peripheral profile of the epitrochoid member a distance X equal to the outward offset of the apex seals, as described in the Prior Art discussion above. In the case of an inner envelope type device 20', as shown in FIG. 4, such carving out requires that the actual peripheral wall surface profile 33 which defines the cavity 34 of the housing 35 be everywhere radially outwardly recessed from the ideal epitrochoid profile 36. In the case of an outer envelope device 21', as illustrated in FIG. 5, such carving out requires that the actual peripheral face profile of the epitrochoid working member, rotor 38, be everywhere inwardly radially recessed from the ideal epitrochoid profile 39. Thus, there is created clearance volumes in the working chambers of the rotary devices which accordingly reduce effective expansion ratios.

In order to minimize this disadvantageous effect, sealing surface profile curves for the apex seals 30 are designed for minimum sealing contact. Of course, a practical seal must be larger than a point; however, the width of an apex seal 30 need only be equal to a cord length subtending twice its leaning angle 40, where angle 40 is one-half the arc angle defining the sealing surface curve. Thus, current industry practice not only prevents epitrochoidal rotary devices from achieving or nearly achieving ideal expansion ratios, but also creates breakdown and wear problems for apex seals due to the desire to utilize a minimum of sealing surface material or creates high manufacturing costs in that expensive material less subject to wear is desirable for the apex seals.

Figure 6:
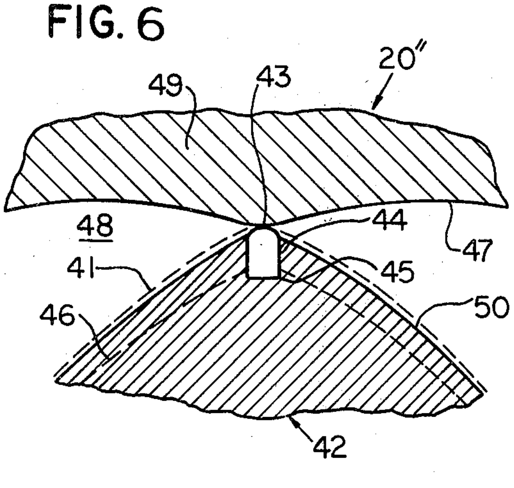
FIG. 6 is a schematic broken-away cross-sectional view showing working member profiles at an apex area for an inner envelope epitrochoidal device constructed in accordance with the present invention.
Figure 7:
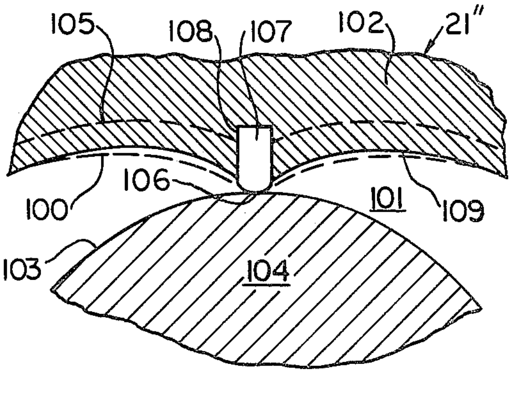
FIG. 7 is a schematic broken-away cross-sectional view showing working member profiles at an apex area for an outer envelope epitrochoidal device constructed in accordance with the present invention.

The present invention provides for a different approach to constructing working member profiles in trochoidal rotary devices such that ideal or nearly ideal expansion ratios may be attained and wider seal faces may be used enabling apex seals to be formed of cheaper, softer materials. FIGS. 6–7 illustrate working member profiles for rotary expansible chamber device 20" and 21" of the inner and outer envelope epitrochoidal type, respectively, formed in accordance with the present invention.

In the case of an inner envelope device, as illustrated in FIG. 6, a modified envelope profile is utilized to define a peripheral face surface 41 for the rotor member 42 such that adjoining peripheral faces of the surface 41 are continuous or substantially flush with a curved sealing face 43 of apex seal members 44. Each apex seal 44 is mounted in a seal slot or groove 45, preferably in spring-loaded fashion. The center of curvature for the sealing face is located substantially radially inward from the corresponding intersection apex of adjoining faces along the rotor periphery 41. For comparison purposes, the dotted line profile 46 depicts how a conventional profile for the rotor envelope member would have appeared if the carving out technique described above in connection with FIG. 4 had taken place. The center of curvature for the apex seal face is positioned about where the apex point for the conventional envelope member profile 46 would have been. Everywhere about the modified rotor periphery, modified profile 41 is spaced radially outward from the conventional envelope profile 46 by a distance substantially equal to the radius of curvature for the curved sealing face 43 of the apex seal.

A peripheral housing wall surface profile 47 for defining housing cavity 48 in the rotor housing 49 is an epitrochoid profile curve modified in accordance with the present invention which will be described later. The envelope periphery profile 41 derives from the modified epitrochoid profile 47. Accordingly, there is a more ideal running clearance relationship between the housing cavity profile 47 and the rotor periphery profile 41 in an inner envelope rotary device according to the present invention. This relationship significantly reduces the presence of conventional seal offset clearance volumes to accommodate the apex seals; hence, nearly ideal expansion ratios are possible. Furthermore, because seal clearance volumes are no longer of concern in the inventively constructed trochoidal device, much wider sealing face surfaces at the envelope apices, than heretofore conventionally practical, can be utilized. By making larger apex seals practical, the present invention enables users to obtain better wear lives for apex seals and assemblies to construct seals of softer, cheaper material.

In actual practice of the inner envelope version of the invention, the modified envelope rotor profile 41 would preferably be shaved or relieved adjacent the apex seals 44 to allow for some possible mechanical interference arising from backlash in the phasing gears. This is because backlash in the gear introduces rotational error in the rotor movement which is most likely to produce interference in the area of the envelope apices. Such shaving woould be in the form of a tapered carving out along the rotor surface peripheral profile, with a maximum depth directly adjacent the sides of the apex seals 44 and a minimum point of no shaving at a central area between adjacent apex seals. An exemplary preferred range of maximum depth for this peripheral relief is less than a few hundredths of an inch. Therefore, the actual peripheral face profile for the rotor 42 is shown as surface 50 in FIG. 6.

Figure 8:
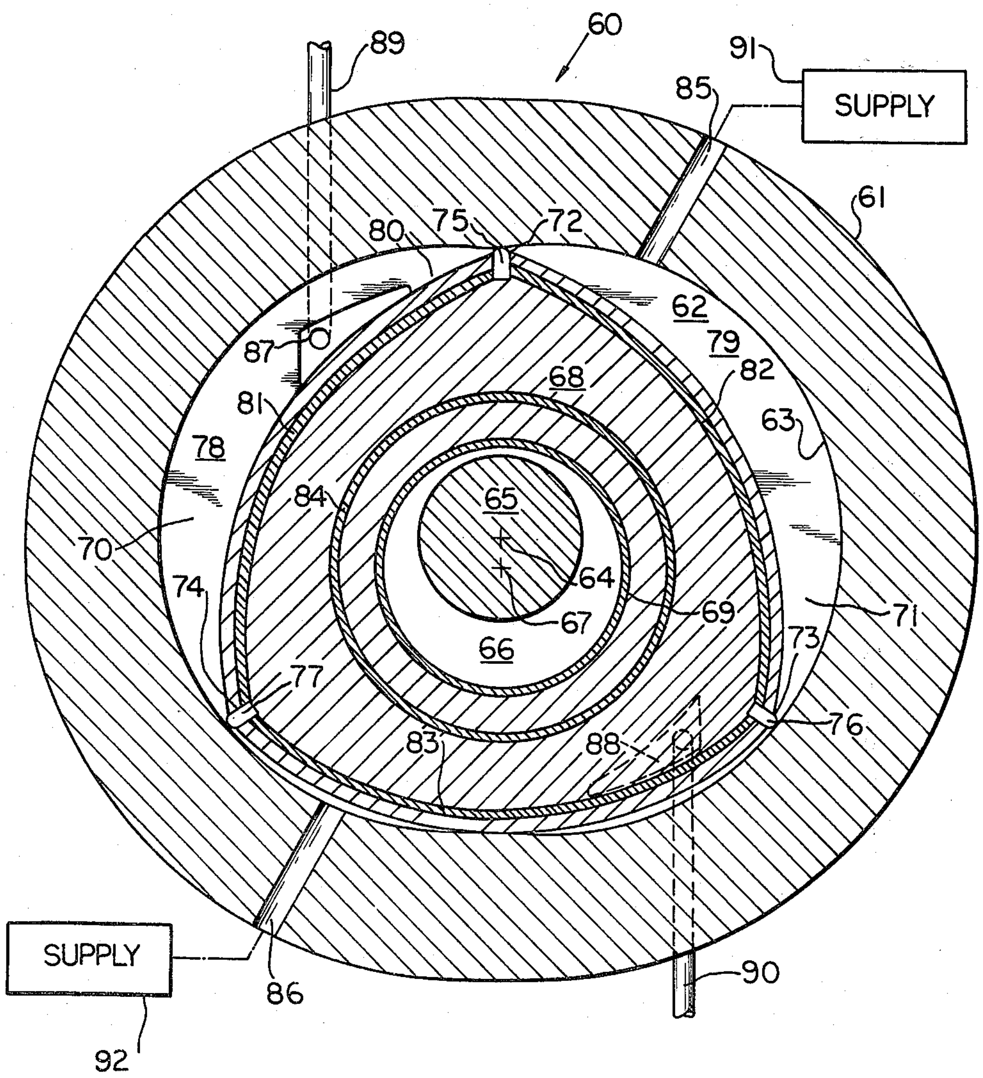
FIG. 8 is a schematic, cross-sectional view of an epitrochoidal device constructed in accordance with FIG. 6.

FIG. 8 depicts an inner envelope epitrochoidal rotary machine 60 incorporating the inventive construction of FIG. 6. The device 60 has a rotor housing 61 defining a cavity 62 with an epitrochoid profile wall surface 63. The cavity 62 is symmetrical about axis 64, which is the centerline axis of a crankshaft 65. Secured to the crankshaft is an eccentric lobe member 66 which is circular about an axis 67. An inner envelope rotor member 68, having a hollow central portion concentric about the eccentric lobe 66, is symmetrical about the axis 67 and, hence, is radially displaced from axis 64 by an eccentricity e. A hollow circular bearing sleeve 69 is located concentric about the axis 67 between the eccentric 66 and the rotor 68 for relative rotation of the rotor on the eccentric.

The housing cavity 63 has two contiguously connected concave lobe portions 70 and 71 and the rotor 68 has three apices 72–74. It will be appreciated, of course, that epitrochoidal cavities of more lobes and rotors with more apices can be used. Apices 72–74 contain apex seals 75–77 in suitable apex slots grooves. Preferably, each apex seal is spring loaded radially outwardly and formed with an unconventionally wide rounded sealing surface for engagement with the cavity wall surface 63. The apex seals serve to contain working fluid in working chambers shown as 78 and 79, which are defined as being between a peripheral profile surface 80 of the rotor 68 and the housing cavity wall 63. Conventional peripheral sealing strips 81–83 are mounted in peripheral recesses formed in the opposed sidewalls of the rotor 68 for sealably engaging corresponding sidewalls of the rotor housing 61. A conventional shaft seal ring 84 is also provided in corresponding peripheral recesses in the rotor sidewalls.

Conventional phasing gear means, not shown, are, of course, provided to control the planetating movement of the rotor 68 in the device housing 61.

The device 60, as shown, may function as a pressure fluid engine. Intake passages 85 and 86 are provided to extend radially through the housing 61 and open into the working chambers 78 and 79, respectively. These passages are provided with suitable inlet valves, not shown, which may be conventional mechanically actuated valves. Exhaust ports 87 and 88 are provided adjacent opposed ends of the respective working chambers 78 and 79 from the intake passages. The exhaust ports are connected to corresponding discharge duct means 89 and 90, which may lead to atmosphere or further work means, such as a secondary expansion engine. The exhaust means 87 and 89 and 88 and 90 do not contain discharge valve means since opening and closing of the exhaust ports to the working chambers is controlled by movement of the peripheral seal strips 81–83 passing over and beneath the exhaust ports 87–88.

As a pressure fluid engine, stations 91 and 92 serve as sources of pressurized fluid, such as steam from a boiler, which communicate directly with the intake passage means 85 and 86. Assuming rotation of the rotor 68 in FIG. 8 to be in the clockwise direction, the position of the rotor 68 as shown in FIG. 8 is such that working chamber 78 is free to exhaust at port 87; while outlet port 88 is closed off and chamber 79 is filling with pressurized fluid. As shown in FIG. 8, the chamber 79 is not yet at its maximum volume and pressurized fluid is just being admitted through intake passage means 86 to begin a new work stroke in chamber 78 as the work stroke is being completed in chamber 79. Fluid expansion in the chambers causes the rotor 68 to planetate. Rotation of the crankshaft 65 results from the movement of the rotor and the engine operation is continuous in the well-known manner.

As those skilled in the art will appreciate, the rotary machine construction 60 could be converted to other uses, such as an internal combustion engine or a compressor, by modification of the intake and exhaust passage means and, in some instances, causing the crankshaft 65 to be externally driven for movement of the rotor 68 in the housing 61.

Turning to an outer envelope device constructed in accordance with the present invention, as illustrated in FIG. 7, the envelope member profile is now a peripheral housing wall surface 100 defining a cavity 101 in a rotor housing 102. The envelope profile is modified such that the curved sealing faces 106 of the apex seals 107 are substantially continuous with adjoining faces of the housing cavity profile 100. Each apex seal 106 is mounted in a seal slot or groove 108, preferably in spring loaded fashion, such that the center of curvature for the sealing face is substantially radially outward from the corresponding intersection point apex of adjoining faces along the housing wall profile 100. For comparison purposes, the dotted line profile 105 depicts how a conventional profile for the outer envelope housing member would have appeared if the profile recessing technique described above in connection with FIG. 5 has taken place. The center of curvature for the apex seal face 106 is positioned about where the apex point for the conventional envelope member profile 105 would have been. Everywhere about the modified cavity profile periphery, modified profile 100 is spaced radially inward from the conventional envelope profile by a distance substantially equal to the radius of curvature of the apex sealing face 106.

The envelope profile 100 is derived from a modified epitrochoidal curve profile, which will be described later, which forms the peripheral surface 103 of the epitrochoid working member, rotor 104. In similar manner as discussed above in connection with FIG. 6, there is a more ideal running clearance relationship between the housing cavity profile 100 and the rotor periphery profile 103 in an outer envelope rotary device constructed in accordance with the present invention. Similarly, because seal clearance volumes are no longer of concern in the inventively constructed trochoidal device, much wider sealing face surfaces at the envelope apices can be utilized.

In actual practice of the outer envelope version of the invention, as similarly discussed above in connection with the inner envelope version, the modified envelope profile 100 would preferably be shaved adjacent the apex seals 107 to avoid possible mechanical interference arising from backlash in the phasing gears. Such shaving would again be in the form of a tapered carving out along the envelope peripheral profile, with the maximum depth occurring adjacent the sides of the apex seals 107 and a minimum point of no shaving at the central area between adjacent envelope apices. The preferred range of maximum depth for this peripheral relief would again be less than a few hundredths of an inch. Accordingly, the actual peripheral face profile for the rotor housing 102 is shown as surface 109 in FIG. 7.

The manner in which modified working member profiles are formed may be described with reference to FIG. 1. The base circle 10, generating circle 11, and generating arm length 14 for generating an ideal epitrochoid profile curve are chosen. Now, in accordance with the present invention, the drawing tip of the generating arm 14 is replaced with a disk 110. The disk has a radius 111 equal to a predetermined seal offset for the apex seals, which is typically the radius of curvature for the apex sealing face. The radius 111 constitutes the offset amount by which epitrochoidal member profiles have been recessed in accordance with the past conventional carving out practice for accommodating apex seal extensions into rotary device housing cavities. The ideal epitrochoid profile 15 is no longer used as the basis for forming the rotary device. The disk 110, replacing the tracing tip of the generating arm 14, is now used to trace out an epitrochoidal swath, indicated generally at 112. The swath produces inner 113 and outer 114 outlines on respective opposed sides of what would have been the ideal epitrochoidal profile 15. For the inner envelope device, such as described in connection with FIG. 6, the outer outline serves as the epitrochoidal curve for the rotor housing from which the inner envelope profile for the rotor is derived. For an outer envelope device, such as described in connection with FIG. 7, the inner outline 113 serves as the epitrochoidal curve for the rotor peripheral profile. The outer envelope curve derived from this epitrochoidal rotor profile serves as the housing cavity profile. The inventive inner and outer envelope epitrochoidal devices thus derived avoid the presence of seal offset clearance spaces in the working chambers and thereby afford nearly ideal expansion ratios in the rotary device.

To obtain approximately the same displacement as the ideal epitrochoidal device which would have been derived from curve 15, the length of the generating arm 14 may be increased for producing the inventive outer envelope device, or decreased for the inventive inner envelope machine, by the seal offset amount.

The wider curved sealing faces for apex seals utilized in rotary devices having working member profiles modified in accordance with the present invention are expected to enable the use of sealing face arc lengths of greater than 30° or leaning angles of greater than 15°. It is further within the contemplation of the present invention that oval or elliptically shaped sealing face surfaces may be used instead of the semi-circular profiles discussed above. In any event, these seals will have an expected seal offset amount by which the modified trochoidal working member profiles may be derived in accordance with the present invention.

Although various minor modifications may be suggested by those versed in the art, it should be understood that I wish to embody within the scope of the patent warranted hereon all such modifications as reasonably and properly come within the scope of my contribution to the art.

I claim as my invention:

1. An improved trochoidal rotary device of the type comprising a first working member having a shaped peripheral profile surface derived from a conventional geometrically exact trochoidal curve formed from a predetermined base circle, generating circle, and generating arm length and a second working member having a shaped peripheral profile surface in the form of a conventional envelope curve derived from said conventional trochoidal curve, said second working member profile having a plurality of apices at which are correspondingly mounted radially outward extending apex seals, said apex seals each having a sealing face profile for sealably engaging said profile surface of said first working member and being offset a predetermined distance from said envelope curve, said apex seals defining working chamber spaces between said first and second working members, wherein the improvement comprises:

said first working member profile surface is that of a modified trochoidal curve formed from said predetermined base circle and generating circle and a modified generating arm length comprising said predetermined generating arm length with a tracing disk centered on the tip thereof, said tracing disk having a radius equal to said predetermined distance, such that said first working member profile surface is radially recessed by said predetermined distance everywhere about the periphery thereof relative to said conventional trochoidal curve, and said second working member profile surface is that of a modified envelope curve derived from said modified trochoidal curve traced by said tracing disk such that said second working member profile surface is radially enlarged by said predetermined distance everywhere about the periphery thereof relative to said conventional envelope curve.

2. The improvement of claim 31, wherein arc length for each of said sealing face profiles is in excess of 30°.

3. The improvement of claim 1, wherein said trochoidal device is an inner envelope type, said first working member being a housing with said first working member profile surface defining a trochoidal cavity, and said second working member being a rotor means mounted for movement in said cavity.

4. The improvement of claim 3, wherein the trochoidal curve is an epitrochoidal curve.

5. The improvement of claim 3, wherein said face profiles are of a semi-circular shape having a center of curvature inward of said second working member from said apices.

6. The improvement of claim 3, wherein said rotor is formed with three peripheral faces and said peripheral wall surface is formed with two opposed lobe portions.

7. The improvement of claim 3, further comprising a shaft mounted in said housing about a first axis with which said trochoidal cavity is symmetrical, an eccentric mounted on said shaft and having a second axis parallel to said first axis, said rotor means being mounted on said eccentric, and said housing having fluid intake and exhaust passage means for conducting pressurized fluid through said working chambers causing said rotor to drive said shaft.

8. The improvement of claim 1, wherein said trochoidal device is an outer envelope type, said second working member being a housing with said second working member profile surface defining a cavity, and said first working member being a rotor means mounted for movement in said cavity.

9. The improvement of claim 8, wherein said housing is formed with four concave-shaped peripheral faces and the profile surface of said rotor means is formed with three convex-extending lobe portions.

10. The improvement of claim 1, wherein said peripheral profile surface of said second working member is shaved very slightly adjacent side surfaces of said apex seals forming arc relief portions.

11. The improvement of claim 10, wherein said arc reliefs are each of a depth being substantially non-existent at a central area between adjacent apices and gradually becoming greater toward corresponding apex seal side surfaces.

12. The improvement of claim 11, wherein the maximum depth of each said arc relief portion is less than 5 hundredths of an inch.

13. A method of manufacturing an inner envelope trochoidal rotary device comprising a first working member having a trochoidal curve shaped peripheral profile surface and a second working member having an envelope curve shaped peripheral profile surface derived from the trochoidal curve, said second member envelope profile having a plurality of apices at which are mounted corresponding apex seal means, said apex seal means each having a sealing face profile for sealably engaging said profile surface of said first working member, said apex seal means defining working chamber spaces between said profile surfaces of said first and second working members, wherein said method comprises:

- selecting a generating circle, a base circle, and a drawing arm length having a tracing tip for generating an ideal trochoid profile,
- determining a common distance for each said apex seal means by which said apex seal means is radially offset from an ideal inner envelope profile derived from said ideal trochoid profile,
- replacing said tracing tip with a tracing disc having its center of curvature at said tracing tip and a radius equal to said common distance,
- generating a trochoidal swath profile, having radially spaced concentric inner and outer outlines, with said tracing disk, said drawing arm, and said base and generating circles,
- forming said first working member profile surface from said outer outline and said second working member profile surface from an inner envelope curve derived from said outer outline, such that said first working member profile surface is radially recessed by said common distance everywhere about the periphery thereof relative to said ideal trochoid curve and said second working member profile surface is radially enlarged by said common distance everywhere about the periphery thereof relative to said ideal inner envelope profile, and
- providing a groove along each apex on said second working member to correspondingly receive respectively said apex seal means therein such that said sealing face profiles are substantially continuous with said second working member profile surface at said respective apices.

14. The method of claim 13, wherein said ideal trochoid profile is an epitrochoid.

15. The method of claim 13, wherein said sealing face profiles for apex seal means are each of a common semicircular arc shape and said common distance is equal to the radius of said semi-circular arc.

16. The method of claim 15, further comprising providing each said sealing face profile with an arc length of greater than 30°.

17. The method of claim 13, further comprising shaving said second working member profile surface very slightly adjacent side surfaces of said respective apex seal means to form arc relief portions.

18. The method of claim 17, further comprising gradually increasing the depth of each said arc relief portion from being substantially non-existent at a central area between corresponding adjacent apices to becoming a maximum at corresponding said apex seal side surfaces.

19. A method of manufacturing outer envelope trochoidal rotary device each comprising a first working member having a trochoidal curve shaped peripheral profile surface and a second working member having an envelope curve shaped peripheral profile surface derived from the trochoidal curve, said second member envelope profile having a plurality of apices at which are mounted corresponding apex seal means, said apex seal means each having a sealing face profile for sealably engaging said profile surface of said first working member, said apex seal means defining working chamber spaces between said profile surfaces of said first and second working members, wherein said method comprises:

- selecting a generating circle, a base circle, and a drawing arm length having a tracing tip for generating an ideal trochoid profile,
- determining a common distance for each said apex seal means by which said apex seal means is radially offset from an ideal outer envelope profile derived from said ideal trochoid profile,
- replacing said tracing tip with a tracing disk having its center of curvature at said tracing tip and a radius equal to said common distance,
- generating a trochoidal swath profile, having radially spaced concentric inner and outer outlines, with said tracing disk, said drawing arm, and said base and generating circles,
- forming said first working member profile surface from said inner outline and said second working member profile surface from an outer envelope curve derived from said inner outline, such that said first working member profile surface is radially recessed by said common distance everywhere about the periphery thereof relative to said ideal trochoid curve and said second working member profile surface is radially enlarged by said common distance everywhere about the periphery thereof relative to said ideal outer envelope profile, and
- providing a groove along each apex on said second working member to correspondingly receive respectively said apex seal means therein such that said sealing face profiles are substantially continuous with said second working member profile surface at said respecive apices.

20. The method of claim 19, wherein said ideal trochoid profile is an epitrochoid.

21. The method of claim 19, wherein said sealing face profiles for apex seal means are each of a common semicircular arc shape and said common distance is equal to the radius of said semi-circular arc.

22. The method of claim 21, further comprising providing each said sealing face profile with an arc length of greater than 30°.

23. The method of claim 19, further comprising shaving said second working member profile surfaces very slightly adjacent side surfaces of said respective apex seal means to form arc relief portions.

24. The method of claim 23, further comprising gradually increasing the depth of each said arc relief portion from being substantially non-existent at a central area between corresponding adjacent apices to becoming a maximum at corresponding said apex seal side surfaces.

* * * * *